US012750931B2

(12) United States Patent
Krauthamer et al.

(10) Patent No.: US 12,750,931 B2
(45) **Date of Patent: *Sep. 29, 2026**

(54) SPECIAL LIGHT EFFECTS SYSTEM

(71) Applicant: Universal City Studios LLC, Universal City, CA (US)

(72) Inventors: Akiva Meir Krauthamer, Orlando, FL (US); Aaron Chandler Jeromin, Orlando, FL (US); Timothy Fitzgerald Garnier, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 18/460,984

(22) Filed: Sep. 5, 2023

(65) Prior Publication Data

US 2023/0422366 A1 Dec. 28, 2023

Related U.S. Application Data

(63) Continuation of application No. 16/828,310, filed on Mar. 24, 2020, now Pat. No. 11,758,626.

(Continued)

(51) Int. Cl.

| | |
|---|---|
| ***H05B 45/12*** | (2020.01) |
| ***A63J 5/02*** | (2006.01) |
| ***G02B 5/124*** | (2006.01) |

(52) U.S. Cl.

CPC ................ *H05B 45/12* (2020.01); *A63J 5/02* (2013.01); *G02B 5/124* (2013.01)

(58) Field of Classification Search

CPC ........ H05B 45/12; H05B 45/10; H05B 47/12; H05B 47/125; A63J 5/02; G02B 5/124;

(Continued)

(56) References Cited

U.S. PATENT DOCUMENTS

| | | | |
|---|---|---|---|
| 4,855,915 | A | 8/1989 | Dallaire |
| 6,342,706 | B1 | 1/2002 | Takeda |

(Continued)

FOREIGN PATENT DOCUMENTS

| | | | |
|---|---|---|---|
| CN | 102123772 | A | 7/2011 |
| KR | 20170129635 | A | 11/2017 |

(Continued)

OTHER PUBLICATIONS

AE Office Action for United Arab Emirates Application No. P6001782/22 mailed Oct. 4, 2024.

(Continued)

*Primary Examiner* — Sahlu Okebato

(74) *Attorney, Agent, or Firm* — Fletcher Yoder P.C.

(57) ABSTRACT

A special effects system includes a retroreflective target, an object comprising one or more light sources disposed on an end of the object, where the end of the object is spatially oriented to face the retroreflective target such that light from the one or more light sources is emitted onto the retroreflective target, and a controller communicatively coupled to the one or more sensors and the one or more light sources, wherein the controller comprises a processor configured to adjust the light from the light source based in part on the on the one or more signals output by the one or more sensors, wherein the signals are indicative of a position of the object, or a condition of the one or more light sources.

19 Claims, 8 Drawing Sheets

Related U.S. Application Data

(60) Provisional application No. 62/988,221, filed on Mar. 11, 2020.

(58) Field of Classification Search
CPC .... A63G 31/00; F21W 2111/10; Y02B 20/40; A63F 13/28; A63F 13/42; A63F 13/80; A63F 13/90; A63F 13/21; H04N 9/3179; H04N 9/3194
See application file for complete search history.

(56) References Cited

U.S. PATENT DOCUMENTS

| | | | | |
|---|---|---|---|---|
| 8,746,914 | B2 | 6/2014 | Nelson et al. | |
| 9,600,999 | B2 | 3/2017 | Stenzler | |
| 9,773,163 | B2 | 9/2017 | Carey | |
| 10,134,267 | B2 | 11/2018 | Kawash et al. | |
| 10,738,972 | B1 | 8/2020 | Kelly et al. | |
| 2002/0036617 | A1 * | 3/2002 | Pryor | G06F 3/011 345/156 |
| 2003/0048926 | A1 | 3/2003 | Watanabe | |
| 2004/0102247 | A1 | 5/2004 | Smoot et al. | |
| 2005/0143173 | A1 * | 6/2005 | Barney | A63F 13/25 463/37 |
| 2010/0225588 | A1 | 9/2010 | Newton et al. | |
| 2013/0177296 | A1 | 7/2013 | Geisner et al. | |
| 2015/0103510 | A1 * | 4/2015 | Reetz | F21V 14/02 348/744 |
| 2016/0018083 | A1 | 1/2016 | Kelly et al. | |
| 2016/0295201 | A1 | 10/2016 | So et al. | |
| 2017/0026612 | A1 | 1/2017 | Rintel et al. | |

FOREIGN PATENT DOCUMENTS

| | | | | |
|---|---|---|---|---|
| WO | WO-2014130884 | A2 * | 8/2014 | A63G 31/00 |
| WO | 2019183399 | A1 | 9/2019 | |

OTHER PUBLICATIONS

Hartescu, Dan et al., "Gaze Tracking as a Game Input Interface", Computer Games (CGames), Jul. 27, 2011 (Jul. 27, 2011), pp. 126-133, 16th International Conference on, IEEE.
Lee, Johnny C. et al., "Moveable Interactive Projected Displays Using Projector Based Tracking", UIST 2005 Proceedings of the 18th Annual ACM Symposium on User Interface Software and Technology, Oct. 23, 2005 (Oct. 23, 2005), pp. 63-72, Seattle, WA.
PCT/US2021/021529 Invitation to Pay Additional Fees mailed Jun. 17, 2021.
"PlayStation Move," Wikipedia, last modified Jun. 24, 2014, http://en.wikipedia.org/w/index.php?title=PlayStation Move&oldid=370488813.
CN Office Action for Chinese Application No. 202180020144.1 mailed Apr. 2, 2025.
IN Office Action for Indian Application No. 202217056994 mailed Jan. 5, 2026.
JP Office Action for Japanese Application No. 2025-084786 mailed Jun. 18, 2026.

* cited by examiner

SPECIAL LIGHT EFFECTS SYSTEM

CROSS-REFERENCE TO RELATED APPLICATION

The present disclosure is a continuation of and claims priority to and benefit of U.S. patent application Ser. No. 16/828,310 entitled "SPECIAL LIGHT EFFECTS SYSTEM," filed Mar. 24, 2020, which claims priority to and benefit of U.S. Provisional Application No. 62/988,221 entitled "SPECIAL LIGHT EFFECTS SYSTEM," filed Mar. 11, 2020, the entireties of which are incorporated by reference into the present disclosure.

BACKGROUND

The present disclosure relates generally to the field of special effects for use in interactive environments, such as a game environment or an amusement park. More specifically, embodiments of the present disclosure relate to a system used to create unexpected light effects for a guest-controlled or handheld device, such as a prop or a toy.

In recent years, it has become more common in amusement parks to create immersive environments that include props, media, and special effects that improve a guest's experience and that support a particular narrative of the environment. In certain immersive environments, it is enjoyable for the guests to have their own devices, e.g., props or toys, that interact with the environment in various ways. In one example, a guest may wish to interact with the immersive environment using a handheld device in a manner similar to that of a favorite movie or game character and to generate a particular effect that simulates effects from the movie or game. However, it is challenging to simulate the types of special effects that are possible in movies and games in the real world, particular in the context of handheld devices that are relatively small and lightweight and that are used in unpredictable and dynamic immersive environments. For example, while light effects may be integrated into handheld devices, special light effects that are highly visible and that simulate a supernatural or unusual light effect may consume large amounts of power to generate these special effects. Accordingly, it is now recognized that it is desirable to create such special light effects, while using less power.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes a moveable platform having a retroreflective target, a location sensor configured to output a signal indicative of a guest's location or line of sight, an object comprising a light source, wherein the object is disposed in the guest's line of sight, and a controller communicatively coupled to the moveable platform and the location sensor. The controller includes a processor configured to identify a gaze direction of the guest based at least in part on the signal, determine that a change in the gaze direction of the guest has occurred based at least in part on a second signal indicative of the guest's location or the guest's line of sight, and in response to determining that the gaze direction has changed, performing an action to adjust the location of the moveable platform.

In accordance with one embodiment, a system includes an object in an environment comprising at least a surface or end oriented to face a retroreflective target, one or more sensors configured to output one or more signals indicative of a position of the surface or end of the object, and a controller communicatively coupled to the one or more sensors and one or more light sources of a projector, wherein the controller comprises a processor configured to receive the one or more signals output by the one or more sensors and to control a projector to project light from one or more light sources onto the surface or end of the object.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
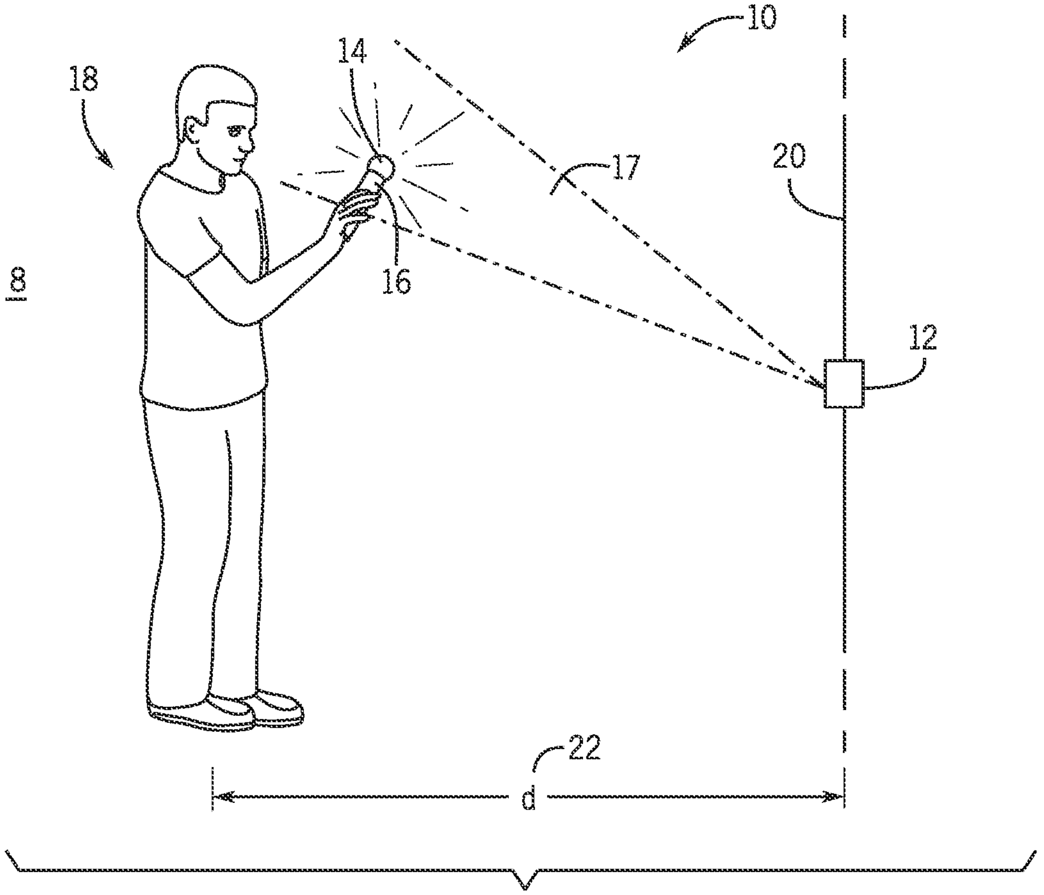
FIG. 1 is a schematic diagram illustrating an embodiment for providing an enhanced light effect, in accordance with present techniques.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

Presently disclosed embodiments facilitate desirable special light effects that may be used in conjunction with objects, e.g., props or toys, within an immersive environment. In an embodiment, the special light effect may be a glowing wand tip (e.g., a halo effect around the wand tip) that appears to be an enhanced effect relative to the normal emitted light generated by the resident light sources. An enhanced special light effects system as provided herein is observed when a user points an object (e.g., a wand) with an active light source (e.g., light emitting diode) emitting light towards a retroreflective target. The bloom or halo effect that is created around the light source may be activated when the light source of the object is oriented toward the retroreflective target to facilitate reflection of the light off of the retroreflective material. When the emitted light is reflected back by the retroreflective target, a bloom effect or halo effect around the light source of the object is created from the light reflected by the retroreflective target. In other words, the object acts to direct light toward the retroreflective target in the special light effects system, and the reflected light is particularly visible around the light source of the object in an unexpected manner that simulates a supernatural effect. The enhanced light effect, i.e., the bloom or halo effect, is an enhancement of the light from the light source that a user would observe in the absence of the retroreflected light. In an embodiment, the presence of light reflected from the retroreflective materials creates a light bloom around the light source of greater diameter and/or enhanced brightness relative to the appearance of the active light source in the absence of the retroreflected light. In an embodiment, the enhanced light effect is observed as a haze or halo formed about the light source.

It may be appreciated that the light source of the special effects light system may be unidirectional or omnidirectional. When the light source is unidirectional, the halo effect may be seen by the user holding the object in his line of sight, though others outside of his line of sight will not see the halo effect. When the light source is omnidirectional, the halo effect may be seen by other nearby observers, because the reflected light is viewable from angles other than directly in the line of sight of the retroreflective target, as the reflected light is visible about peripheral portions of the light source. The visibility of the of the bloom or halo effect may be adjusted by varying aspects of the special effects light system (e.g., the distance between the light source and the retroreflective target, the surface of the retroreflective target, and so forth). It may be appreciated that one or more controllers may be used to implement these special light effects.

Further, it should be appreciated that, while embodiments of the disclosure are discussed in the context of a wand, toy, or handheld object, it should be understood that the disclosed embodiments may be used with other types of objects. Such objects may include wearable objects, such as clothing, jewelry, bracelets, headgear, glasses. In addition, the object may be a prop or scenery item within an immersive environment. The immersive environment may be an environment of an amusement park, an entertainment complex, a retail establishment, etc.

FIG. 1 is a schematic diagram illustrating an embodiment for providing an enhanced light effect in an environment 8, in accordance with present techniques. As shown, an enhanced special light effects system 10 is used to create the enhanced light effect by spatially orienting a light source 14 that is disposed on an end of an object or toy 16 (e.g., a wand) held by a user 18 so that it is directed toward a retroreflective target 12. The retroreflective target 12 shown is in the form of a planar retroreflective surface forming a portion of a wall 20 as shown in the illustrated embodiment, though it may be appreciated that the retroreflective target 12 can also encompasses an entire wall or area of an attraction and may be planar or nonplanar. As may be appreciated, the retroreflective target 12 may reflect light rays 17 emitted from the light source 14 back toward the wand 16. The reflection of the light rays 17 from the retroreflective target 12 to the user's eyes creates a halo effect or bloom effect that appears to be emanating directly from the light source 14, creating an enhanced viewing experience for the user 18. Indeed, the halo effect is observed when the wand 16 is positioned by the user 18 to point the light source 14 in the direction of the retroreflective target 12. It may be appreciated that the light effect is spatially selective in this manner. That is, if the light source 14 of the wand 16 is not pointed at the retroreflective target 12, the halo effect will not be created. Further, other light sources present in the immersive environment may be switched off or inactivated in conjunction with the halo effect to enhance the visibility of the halo.

It may be appreciated that a distance 22 between a desired location of the user while viewing the halo effect and the retroreflective target 12 may considered in the design of the immersive environment, e.g., theme or amusement park attractions. For example, certain attractions may include one or more retroreflective targets 12 to facilitate creation or viewing of the special light effects for the user 18 when entering a particular amusement park attraction. That is, the user may carry the wand 16 with him throughout the amusement park and experience no noticeable special light effects until the user 18 enters an area of the amusement park that is designed to create the special light effect. In one non-limiting example, an entrance to a particular attraction (e.g., a ride) may have one or more retroreflective targets 12 positioned on (e.g., embedded into) the entrance (e.g., a door or gate). Thus, when the user 18 is waiting in line to enter the particular attraction, the user 18 may effectuate the halo effect when he points his wand 16 to the entrance (e.g., a door or gate) having the retroreflective target 12, where the halo effect created indicates to the user that he is in the correct position and/or has completed the final step to enter the particular attraction. In this manner, an active halo effect may be used to position the user at a location associated with the distance 22 between the retroreflective target 12 and the user 18. Once at the location, additional effects may be activated. In another non-limiting example, the special light effect system may be designed to include one or more actuatable objects. In this example, the user 18 may point his wand 16 at an actuatable object that has been designed to include a retroreflective target 12. For example, the retroreflective target 12 may be exposed when a dragon opens its mouth (e.g., the actuatable object). When the user is able to point to wand 16 to direct the light rays to the retroreflective target 12 in the dragon's mouth, the light rays are reflected by the retroreflective target 12 towards the wand 16. Accordingly, the user 18 experiences the enhanced light effect (e.g., halo effect) around light source 14 in conjunction with activation of the actuatable effect, which creates the illusion that the halo effect is caused by the actuatable effect.

It may be appreciated that the light source 14 of the wand 16 may be unidirectional, multidirectional, or omnidirectional. In cases where the light source 14 is unidirectional, the halo effect is seen when the wand 16 is pointed directly at the retroreflective target 12. In other words, the halo effect is generally only seen by the user 18 whose line of sight is directly in line with the retroreflective target 12 and who receives reflected light from the retroreflective target 12. Indeed, other observers whose line of sight is outside that with the retroreflective target will not see the halo effect. However, in instances where the light source 14 is multidirectional or omnidirectional, the halo effect can be seen regardless of the angle that the wand 16 is held and/or pointed so long as there is retroreflective material of the retroreflective target 12 in a line of sight of the user/observers. For example, the retroreflective target 12 may be implemented as a relatively large surface capable of being in the line of sight of multiple observers.

Figure 2:
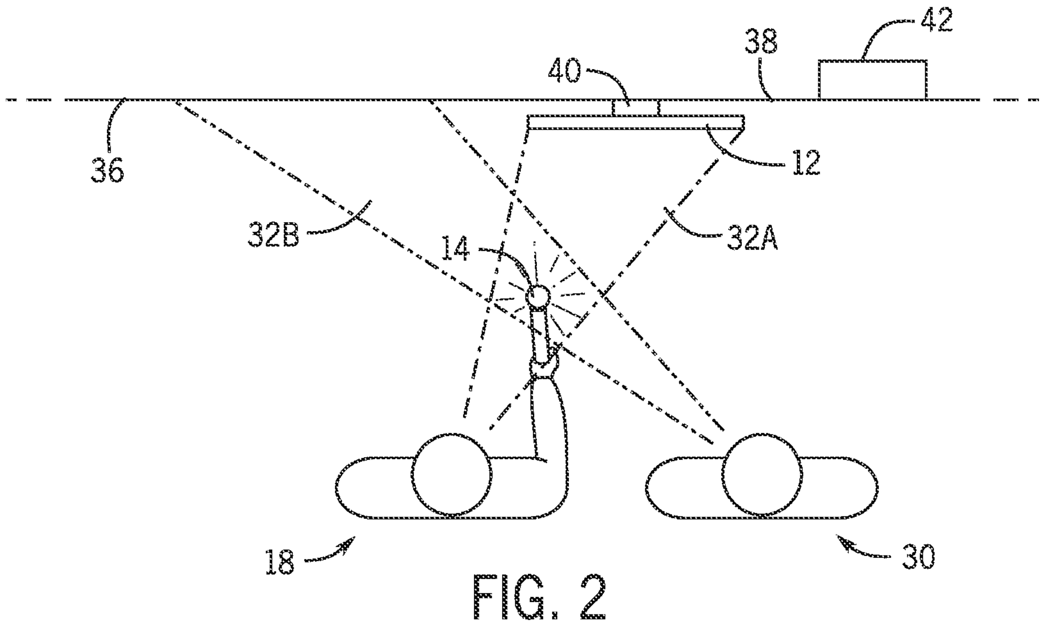
FIG. 2 is a schematic diagram illustrating an alternate embodiment for providing the enhanced light effect, in accordance with present techniques.

FIG. 2 is a schematic diagram further illustrating an embodiment for providing the enhanced light effect, in accordance with present techniques. As shown, the guest 18 holding the wand 16 sees a halo effect in his line of sight 32A because the light of light source 14 is reflected from the retroreflective target 12. The observer 30, whose line of sight 32B, does not include the retroreflective target 12 but instead extends to a non-retroreflective portion 36 of the surface 38, does not see any halo effect. Instead, the observer 30 merely sees the activated light source 14 without the halo effect, e.g., the nonenhanced light effect. In the illustrated embodiment, the retroreflective target 12 is positioned on a moveable platform 40, such as a gantry, which is able to move along the surface 38 to reposition the retroreflective target 12. Thus, the retroreflective target 12 may be repositioned to remain collinear with the light of sight 32A of the user 18 even with changes in gaze direction. The gaze direction of the user 18 and/or the observers 30 may be tracked via a camera 42 or other gaze tracker.

Figure 3B:
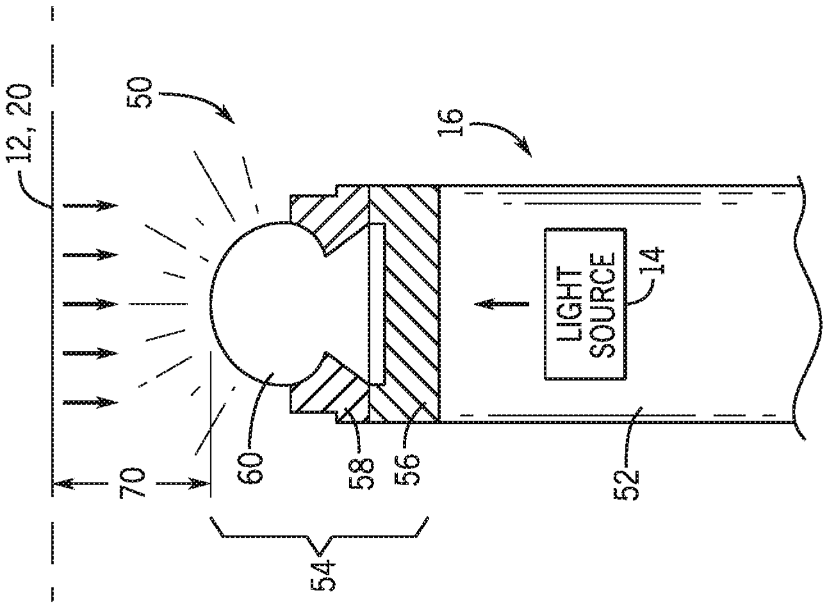
FIGS. 3A-3B illustrate a perspective view of a special effects assembly prior to and during operation of a light source that is directed towards a retroreflective target to create the halo effect, in accordance with present techniques.
Figure 3A:
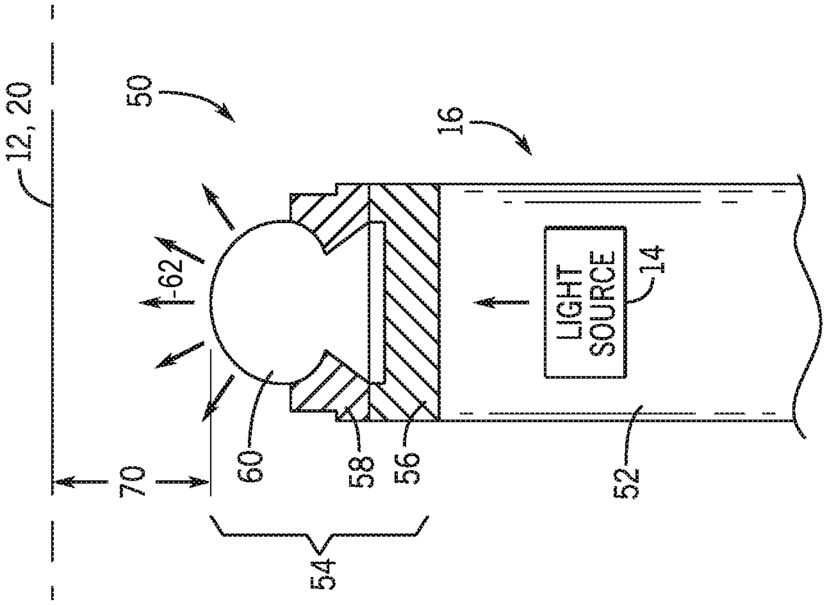

Various properties of the special effects light system may be further understood with reference to FIGS. 3A-8. FIGS. 3A-3B illustrate a perspective view of a special effects assembly 50 (e.g., a wand) implemented as a handheld object and illustrated and during operation (e.g., activation) of the light source 14 (e.g., a light emitting diode). As depicted, the special light effects assembly 50 is positioned to face or be oriented towards the retroreflective target 12. The special light effects assembly 50 includes the wand 16 and the light source 14 disposed on or within the wand 16. The light source 14 is generally housed on or within a barrel portion 52 of the special light effects assembly 50. The barrel portion 52 is coupled to a cap assembly 54 which includes a cap 56 and a lens mount 58. The lens mount 58 holds a lens 60, through which light rays 62 from the light source 14 pass, and disperses the light rays 62 as the rays 62 are emitted through the lens 60, as shown in FIG. 3A. The arrangement of the light source 14 relative to the wand 16 or other housing may be selected to emit the rays 60 in a selected range such that the directionality of the light is either narrower or wider depending on the desired use in the system 10.

Though the light source 14 illustrated here is understood to be a light emitting diode, it is understood that the light source 14 can be any suitable light source to create an illuminating effect such as fiber optic cables or pyrotechnic or chemical means, among others. Further, it may be appreciated that in certain embodiments, the user 18 does not need to utilize any other power source with the light source 14 (e.g., light emitting diode) in the wand 16 to experience the halo effect. The light source 14 may be powered via a battery, a wireless power transmission (e.g., UHF), or the like.

The intensity of the halo effect within the user's 18 line of sight depends on the size and placement of the retroreflective target 12, the size and intensity of the light source 14, the distance between the light source 14 and the retroreflective target 12, and the surface of retroreflective target 12 (e.g., surface texture, etc.), among other factors. In one non-limiting example, the reflection of the light source 14 may be manipulated through changing the surface texture of the retroreflective target 12. As may be appreciated, the retroreflective sheeting or target 12 may utilize reflective targets such as retroreflective glass beads, microprisms, or encapsulated lenses sealed onto a fabric or plastic substrate in order to achieve its reflective properties. As such, the reflected light may further be diffused by disposing additional reflective targets to increase the reflective surfaces between the retroreflective glass beads, microprisms, or encapsulated lenses by scattering or reflecting the light multiple directions.

In another non-limiting example, the intensity of the halo effect can be adjusted based upon a distance 70 between the special effects assembly 50 and the retroreflective target 12, as shown in FIG. 3B. Indeed, FIG. 3B illustrates that the smaller the distance 70 between the light source 14 and the retroreflective target 12, the brighter the halo effect. As the distance 70 between the light source 14 and the retroreflective target 12 increases, the halo effect would be smaller and less intense as the reflected light would have a greater distance to diffuse.

Figure 4B:
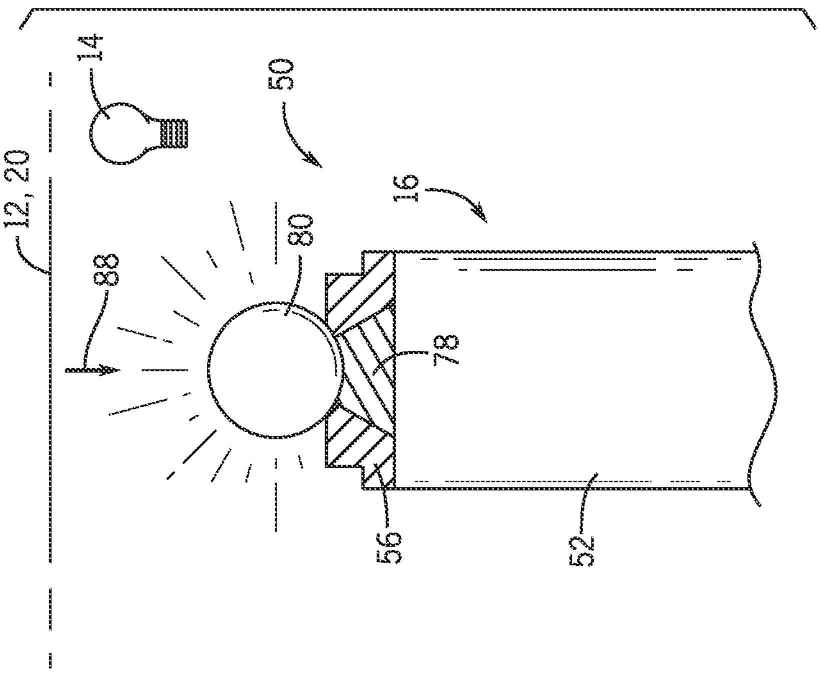
FIGS. 4A-4B illustrate a perspective view of an alternate embodiment of a special effects assembly prior to and during operation of a light source that is directed towards a retroreflective target to create the halo effect, in accordance with present techniques.
Figure 4A:
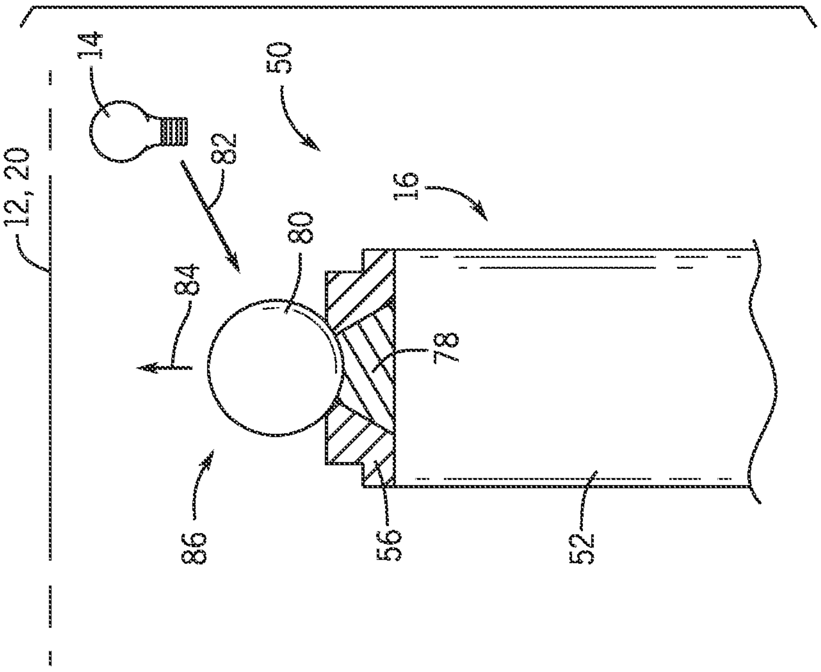

Turning now to FIGS. 4A-4B, an alternate embodiment of the special effects assembly 50 is shown. In the illustrated embodiment, the light source 14 is located externally from the wand 16. When the light source 14 is positioned separate from and outside of the barrel portion 52, the special effects assembly 50 utilizes a reflector 80 or emissive film or coating to achieve the desired halo effect. In another embodiment, a phosphorescent coating or a phosphor coating may be used to achieve the desired halo effect. In the illustrated embodiment, the special effects assembly 50 includes a cap 56 coupled to a reflector mount 78. The reflector 80 may be disposed on the reflector mount 78. The reflector mount 78 may be in the form of a mirror ball, a faceted mirror ball, or any other suitable reflector. However, it should be understood that other arrangements are contemplated.

As shown in FIG. 4A, the light source 14 is positioned to emit light onto the reflector 80, as illustrated by arrow 82. The light is then reflected by the reflector 80 towards the retroreflective target 12, as illustrated by arrow 84. It may be appreciated that the light source 14 can be positioned such that the light is targeted to the reflector 80, here located at the wand tip 86 (or other surface or end of the wand 16 that includes the reflector 80 oriented towards the retroreflective target 12), but is not directed directly into the eyes of the user 18. FIG. 4B depicts the light being reflected back toward the reflector 80, as illustrated by arrow 88. As the light is reflected toward the reflector 80, the halo effect is once again observed by the user 18. The light source 14 may be a laser light source, such as a laser projector, that tracks a location of one or more wand tips 86, within the environment. The tracking may be accomplished by a camera (e.g., camera 42, FIG. 2) that captures the environment 8 and any wand tips 86 located within the environment. This facilitates directing the external light from the light source 14 to a target one or more wand tips 86 to allow only one wand 16 or only a subset of the wands 16 present to illuminate and exhibit the halo effect. Further, the external light source 14 may project different color lights onto individual wand tips 86 to achieve different color halo effects. In one example, the illumination may be based on other guest tracking information that is captured by sensors of the environment, such as voice recognition or sound location to indicate that a particular guest 18 has said a correct passphrase or based on guest location or guest interaction with the environment. In another example, the illumination may be based on guest or wand identification (e.g., camera-based identification features matched to a wand and/or guest profile).

Though the discussion of the present disclosure to this point has focused on the light source 14 being reflected in a wand like apparatus, it may be appreciated that the light source 14 can be disposed in any other suitable objects or arrangements, as discussed further with reference to FIGS. 5A-7B.

Figure 5A:
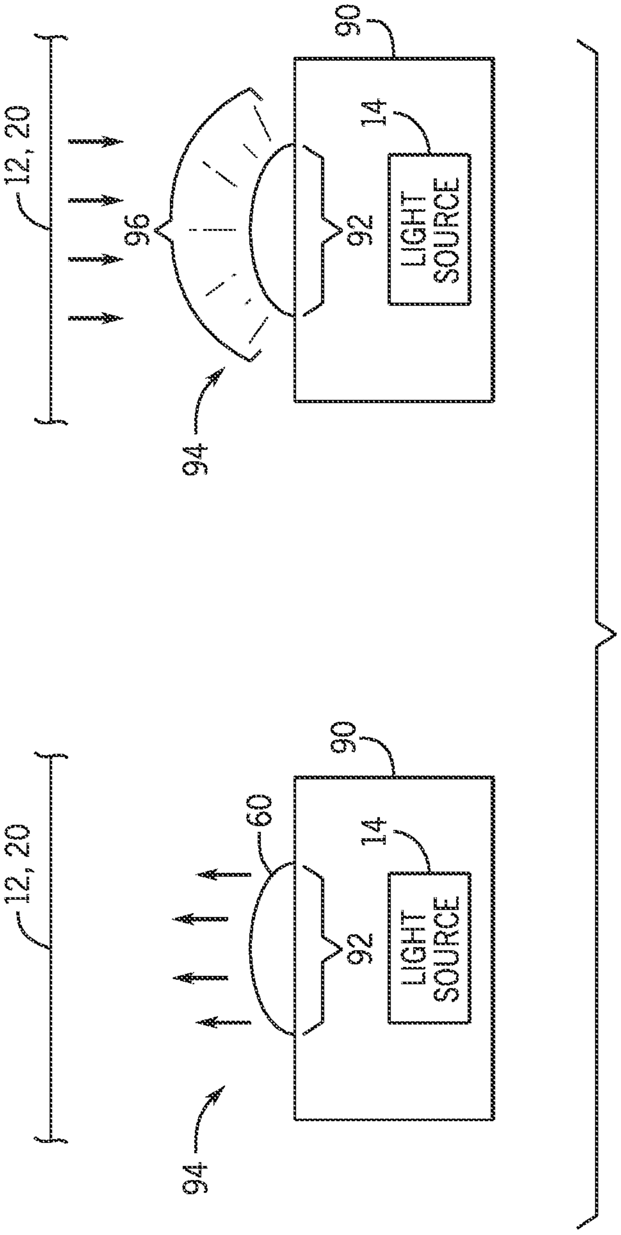
FIGS. 5A-5B illustrate a perspective view of an alternate embodiment of a special effects assembly prior to and during operation of a light source where the light source is disposed in a prop, in accordance with present techniques.
Figure 5B:
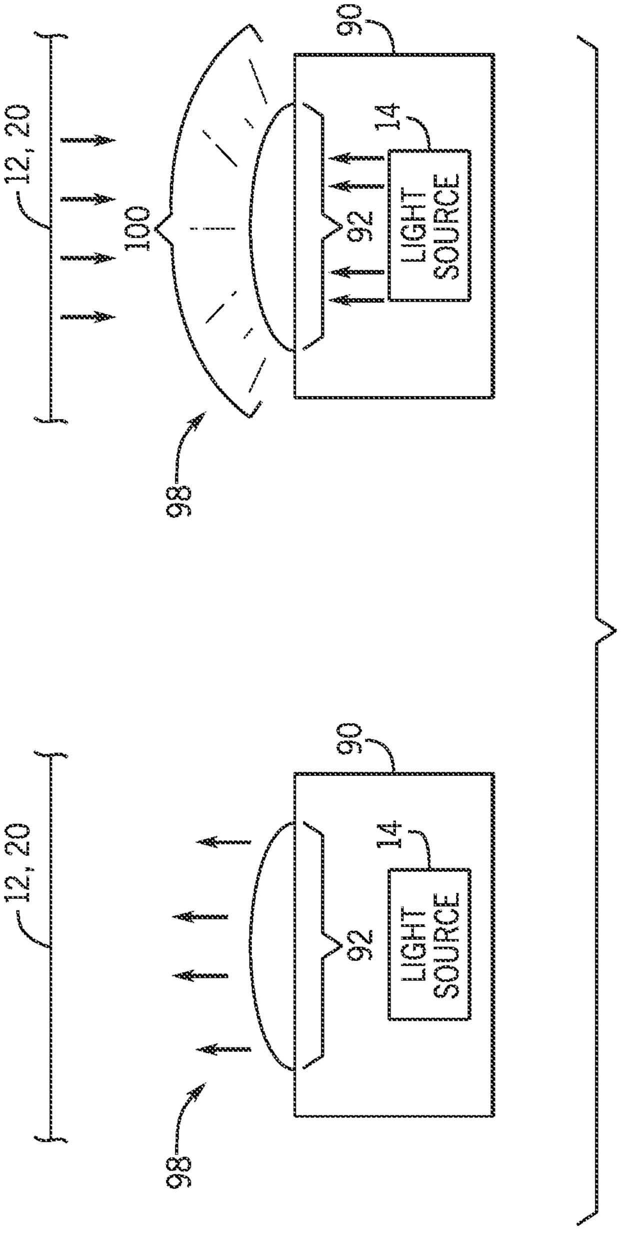

FIGS. 5A-5B illustrate a perspective view of an alternate embodiment of a special effects assembly during operation of a light source (e.g., a light emitting diode) in which the light source 14 is recessed or hidden in an object (e.g., a prop). In the illustrated embodiment, the object hiding the light source represents a stage prop 90. The stage prop can be any type of prop where a glowing effect would be desirable (e.g., a diamond, a rainbow, a pot of gold, a door, gates to heaven, etc.). In order to facilitate the desired halo effect, the stage prop may be equipped with a cut out or receptacle 92 to receive the lens 60. The receptacle may vary in size depending on how large the desired halo effect should be. By utilizing a larger receptacle, one or more lenses 60 can be used to achieve a larger halo effect for large objects, such as stage props. The example in FIG. 5A illustrates a prop with a lens 60 and corresponding receptacle 92 covering a middle portion 94 of the prop 90. As the light source 14 is reflected, the halo effect generated by the reflection of the light from the retroreflective target 12 creates a halo effect around the middle portion 94 where the lens 60 directs the light from, as shown by arrow 96 in FIG. 5A. In contrast, the example in FIG. 5B illustrates a prop with a lens 60 and corresponding receptable 92 covering a majority portion 98 of the prop 90. Here, as the light source 14 is reflected, the halo effect generated by the reflection of the light from the retroreflective target 12 is created around the majority portion 98, as shown by arrow 100 in FIG. 5B.

It may be appreciated that certain embodiments, the retroreflective target, e.g., retroreflective target 12 as provided herein, may include a diffraction grating. The diffraction grating may help shape the halo effect by controlling the pattern that the light is reflected by splitting and dispersing the light rays into additional beams as they are reflected from the retroreflective target 12 to create the halo effect. The diffraction grating may include a repetitive pattern embedded within the grating itself. The gratings may be made by depositing one or more coatings (e.g., a metallic coating) on the retroreflective target to create ridges in the retroreflective target 12. Thus, when the light is reflected from the grooves, the light is reflected at different angles to create different shapes.

Figure 6B:
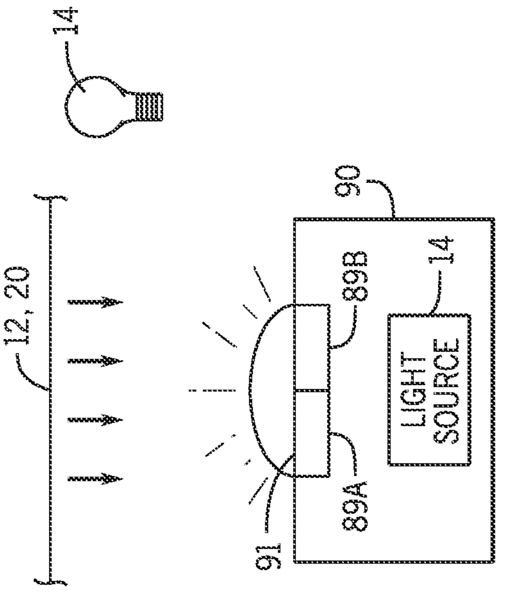
FIGS. 6A-6B illustrate a perspective view of an alternate embodiment of a special effects assembly prior to and during operation of a light source, in accordance with present techniques.
Figure 6A:
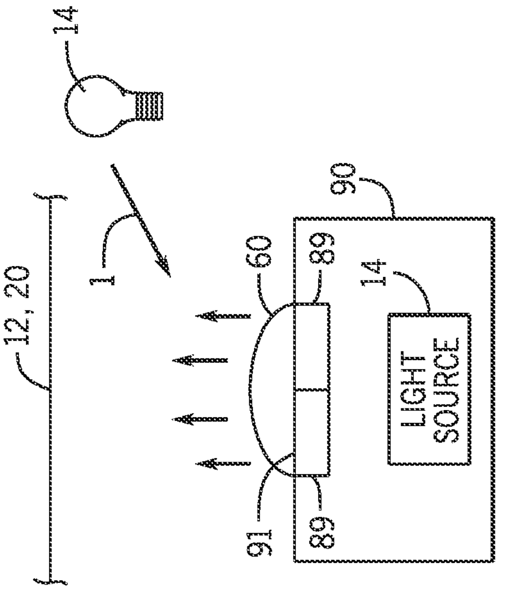

FIGS. 6A-6B illustrate a perspective view of an alternate embodiment of a special effects assembly during operation of a light source (e.g., a light emitting diode). In the illustrated embodiment, the stage prop 90 includes at least one light source 14. Between the light source 14 and the lens 60, one or more different colored semi-transparent pieces of suitable material 89 (e.g., tape, paper, plastic film, etc.) are disposed along a portion 91 of the prop 90. As the light is emitted through the lens 60, the light passes through the one or more different colored semi-transparent pieces of material 89. As the light source 14 is reflected from the retroreflective target 12, the reflected light creates a halo effect around the lens 60. Depending on where along the lens 60 the light is reflected, a different color halo effect may be created. Indeed, as shown in FIG. 6B, the halo effect exhibited near a first semi-transparent piece 89A (e.g., blue) may be different than the halo effect exhibited near a second semi-transparent piece 89B (e.g., red). Depending on the angle of the guest's line of sight, a different color halo effect may be observed.

Figure 7B:
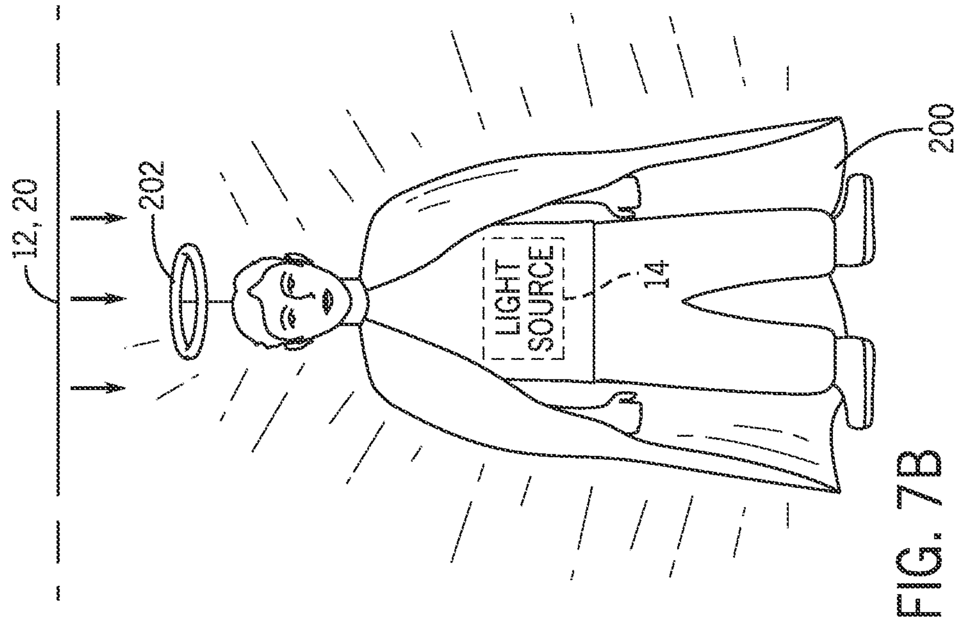
FIGS. 7A-7B illustrate a perspective view of an alternate embodiment of a special effects assembly prior to and during operation of a light source where the light source is disguised in a set object, in accordance with present techniques.
Figure 7A:
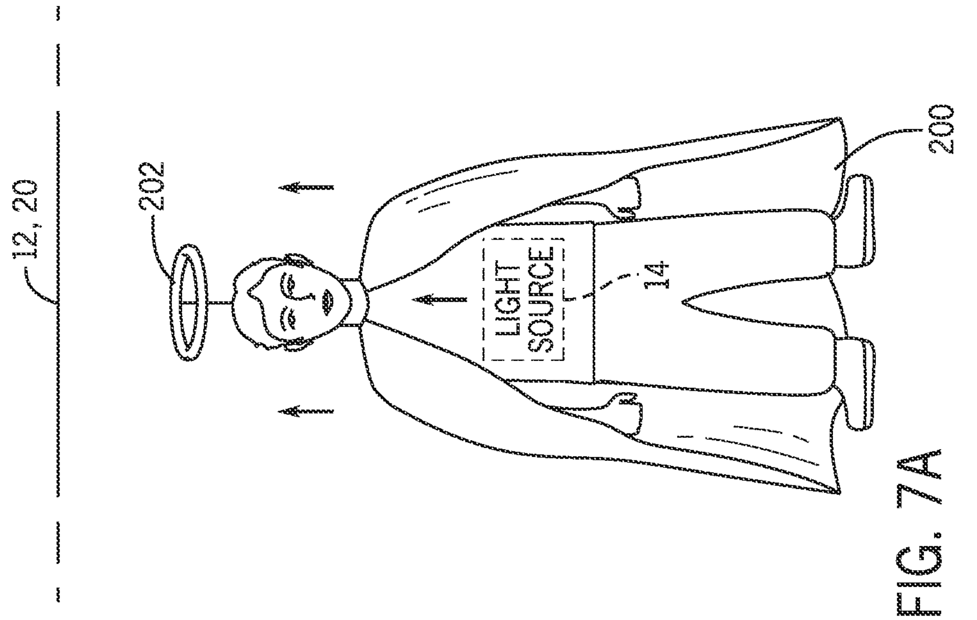

FIGS. 7A-7B illustrate a perspective view of a special effects assembly during operation of a light source 14 (e.g., a light emitting diode) in which the light source is disguised in a set object (e.g., a cape 200), in accordance with present techniques. For example, in the illustrated embodiment, the light source 14 may be built into an actor's cape 200 using light sources sewn into a textile, an electroluminescent fabric, or any other suitable light source. The light source 14 may be invisible to the audience in some instances when the actor's back is away from the audience. Though the light source 14 may not be seen by the audience, the bloom or halo effect can be observed by the audience when looking at the actor as the light source 14 is reflected from the retroreflective target 12 behind the actor.

It may be appreciated that the light source 14 may be disposed on other parts of the actor's costume (e.g., shoes, hat, a halo 202, etc.). For example, in the illustrated embodiment, the actor's halo 202 could include a separate light source 14 such that the bloom or glow effect can be observed around the actor's halo 202. It may be appreciated that a cluster of lights 14 may be accumulated in one particular area of the actor's costume (e.g., halo, cape, etc.) in order to increase the glow effect around the particular area. For example, the glow effect around the halo could be activated by turning on the light source 14 of the halo 202 when the actor enters the gates of heaven, thereby illuminating the halo when the actor is let into heaven. In some embodiments, the light sources 14 disposed in different areas may be controlled independently of each other. For example, the light source 14 on the actor's cape 200 may have a different power source than that of the light source 14 on the halo 202. The set designer may then configure the light source 14 of the halo to turn on at a different time or flash on and off at different intervals than that of the light source 14 of the cape. Controls of the spot light effects may be further understood with reference to FIG. 8.

Figure 8:
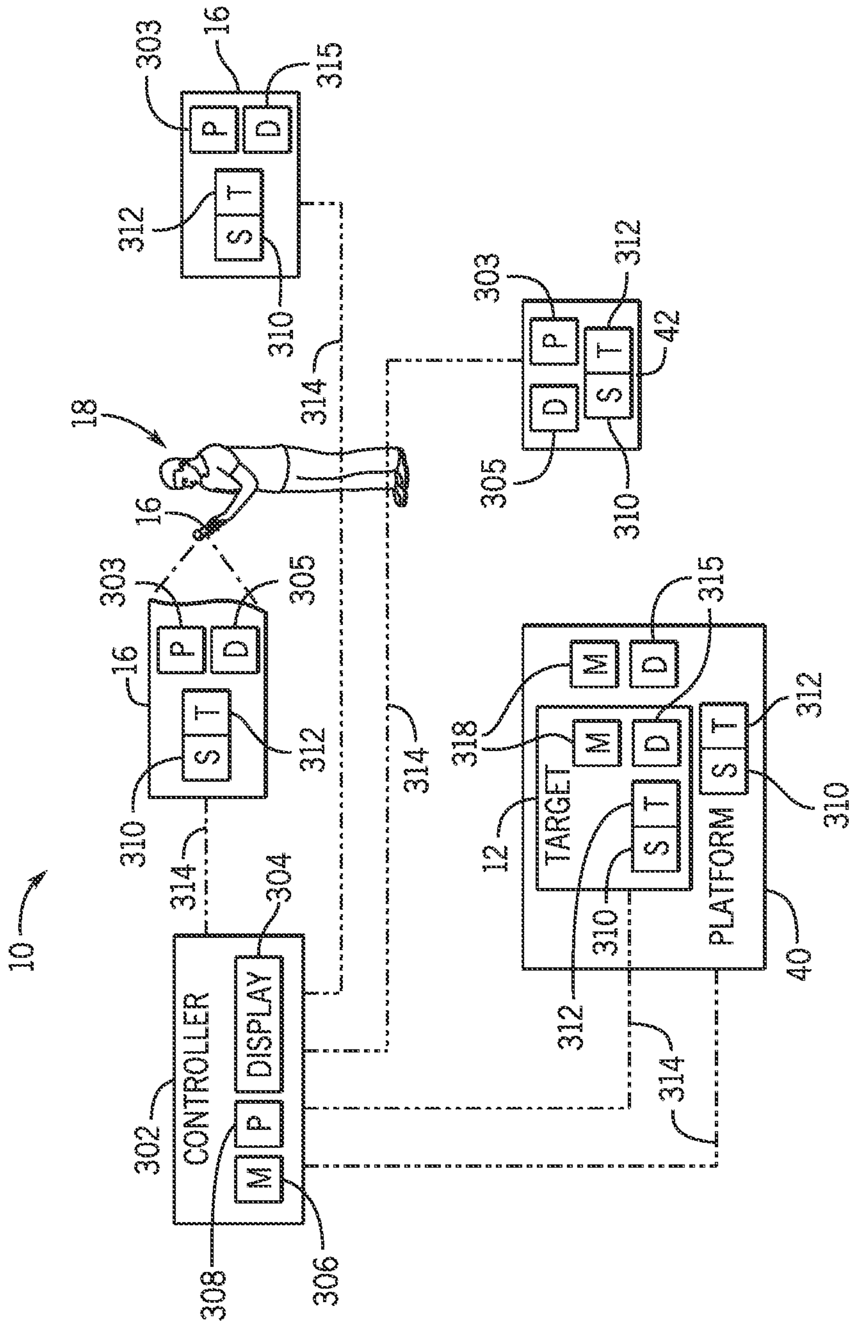
FIG. 8 is a block diagram illustrating an embodiment including a controller for adjusting properties of the enhanced light effect, in accordance with present techniques.

FIG. 8 is a schematic diagram illustrating an embodiment for controlling an enhanced light effect, in accordance with present techniques. It may be appreciated that various aspects of the special light effects system 10 may be controlled via one or more controllers 302. The one or more controllers 302 may include a display 304, a memory device 306 for storing instructions executable by a processor 308 to perform the methods and control actions described herein. The processor 308 may include one or more processing devices, and the memory may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor.

It may be appreciated that the controller(s) 302 may be used to control various properties of the special light effects system 10 including but not limited to: actuation of object(s) containing the retroreflective target(s) 12, speed or movement of the retroreflective target 12, creation of surface texture on the retroreflective target 12, misting of droplets to increase the diffusion of the reflected light, or various color light sources, among other aspects. In addition, the system may receive inputs from one or more sensors 310, such as guest position sensors, audio sensors, camera, or optical or radiofrequency communicators that in turn are used to activate the light source 14 and/or reposition the retroreflective target 12 via movement of the movable platform 40. For example, the controller 302 may wirelessly communicate with the object, e.g., the wand 16, to cause the light source 14 to be activated based on the particular user 18 achieving a goal or being positioned in a particular position in the environment. The controller 302 may be in electronic communication (e.g., wired or wireless communications 314) with the target 12, object 16, the platform 40, the camera 42, or any other sensor containing components of the special effects light system 10 via one or more communication channels (e.g., wireless communication channels 314). The controller 302 is then able to adjust or control the target 12, object 16, the platform 40, the camera 42, or any other sensor containing components of the special effects light system 10, as explained in further detail below.

As may be appreciated, the target 12, the object or wand 16, the platform 40, and the camera 42 may each contain one or more sensors 310 to detect one or more operating conditions of the environment. The sensors 310 may each be coupled to a transmitter 312. The transmitters 312 may convert the sensor data (e.g., operating condition data) detected by the one or more sensors 310 into signals and transmit the signals to the controller 302.

Each of the target 12, the object or wand 16, the platform 40, and the camera 42 may each contain a power source 303. By way of example, various electrical components (e.g. circuitry) disposed in the wand 16 are utilized to interpret the operating conditions detected by the wand sensors 310. In one embodiment, an electrical circuit may be used to control the light source 14. For example, when a switch 305 is toggled to an "on" position, the power from the power source 303 is allowed to flow through the circuit and onward to the light source 14 to turn on the light source 14. It may be appreciated that other objects 16, such as a prop, may be activated within in the system in a similar manner (e.g., via a power source 303 and a switch 305 for the prop).

In another example, various electrical components (e.g. circuitry) disposed in the platform 40 are utilized to interpret the operating conditions detected by the platform sensors 310. In response to a sensor output, the power source 303 (e.g., battery) of the platform 40 may be activated to operate a drive 315 of the platform 40. The drive 315 may activate a motor 318 to actuate the platform 40. In a similar manner, the retroreflective target 12 may be driven along the platform 40 itself. Indeed, the retroreflective target 12 may utilize its own circuitry to interpret the operating conditions output by the retroreflective target sensors 310. In this manner, the power source 303 of the retroreflective target 12 may be used to operate a drive 315 of the target 12, which may then activate a motor 318 to actuate the target 12 along the platform 40. It may be appreciated that the camera 42 may be moved within the system 10 in a similar manner (via its own power source 303 and drive 315).

The controller(s) 302 may be used to control a first group of light sources 14 of the special effects light system 10 to turn on at a different time than a second group of light sources 14, flash on and off at different intervals, or shine at a different intensity than that of a second group of light sources 14 of the special effects light system 10. In some embodiments, the controller(s) may be used to activate the light sources 14 in a particular sequence such that the halo effect is experienced in a particular order (e.g., glow first occurs near the actor's cape and then another glow occurs near the actor's halo, etc.).

The controller(s) may also be used to control the actuation of one or more objects containing the retroreflective targets throughout the amusement park. Various objects throughout the amusement park may house the retroreflective targets 12. As discussed above, an entrance to a particular attraction (e.g., a ride) may have one or more retroreflective targets embedded into the entrance (e.g., a door or gate). Thus, when the user 18 is waiting in line to enter the particular attraction, the user 18 may effectuate the halo effect when he points his wand 16 to the entrance (e.g., a door or gate) having the retroreflective target 12, where the halo effect created indicates to the user that he is in the correct position and/or has completed the final step to enter the particular attraction. It may be appreciated that the retroreflective target 12 may disposed in any number of suitable actuatable objects.

It may appreciated that one or more controller(s) 302 may be used to control the movement of the retroreflective target 12. In one embodiment, the retroreflective target 12 may be disposed on the gantry 40, where the gantry 40 is controlled by the controller 302 to move the retroreflective target 12. The gantry 40 can be moved in one or more directions, in different patterns (to simulate a moving target), at different speeds, to correlate the movement to a beat of a song that is playing, and the like. In this way, the user 18 may experience a challenge in trying to point his wand 16 to the retroreflective target 12 to achieve the glow or halo effect. In another embodiment, the one or more controller(s) 302 may adjust the location of the retroreflective target 12 positioned on the moveable platform 40 based on guest tracking information that is captured by sensors of the environment, such as a sound location to indicate that a particular guest 18 is located in a particular area. Additionally, the one or more controller(s) 302 may adjust the location of the retroreflective target 12 positioned on the moveable platform 40 to remain collinear with the light of sight 32A of the user 18 even with changes in gaze direction. As discussed above, the gaze direction of the user 18 and/or the observers 30 may be tracked via one or more cameras 42 or other gaze trackers.

The controller(s) 302 may be used to create a surface texture on the retroreflective target 12 to effect the manner in which the light is reflected from the target 12. This may be achieved by spraying a texturizing agent on the target 12, disposing additional light reflecting beads or prisms on the retroreflective target 12, or any other suitable manner to create a desired light effect. As discussed above, the reflected light may further be diffused by disposing additional reflective targets to increase the reflective surfaces between the retroreflective glass beads, microprisms, or encapsulated lenses by scattering or reflecting the light multiple directions.

In another embodiment, the controller(s) may provide a mist or spray of droplets between the light source and the retroreflective target 12 to adjust the diffusion of the reflected light. By providing a mist, the reflected light scatters to reduce the amount of light directly reflected to the light source, thereby reducing the glow effect. Finally, it may be appreciated that the light source(s) 14 may include more than one color light source. In some embodiments, the controller(s) may be used to change from one color to another, alternate between colors, or illuminate certain colored lights for a particular amount of time, in a particular sequence, or in response to a particular condition being met. In another embodiment, the controller(s) may combine with a pepper's ghost effect allowing the light source 14 and/or the retroreflective target 12 to be located out of view of the guest 18, so that the halo effect is visible only via reflection from glass positioned at a suitable angle (e.g., 45 degrees) to achieve the desired pepper's ghost effect.

While only certain features of the invention have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A special effects light method configured to generate a halo effect, the method comprising:

receiving, via one or more sensors, one or more signals indicative of a position of a surface or end of an object oriented to face a retroreflective target, and indicative of identification of the object or a guest holding the object, wherein the surface or end of the object comprises a reflector; and emitting light from one or more light sources onto the surface or end of the object based on the one or more signals indicative of the position of the surface or end of the object, wherein the one or more light sources are separate from the object and the retroreflective target, and wherein the retroreflective target is configured to receive the light from the reflector of the object and to retroreflect the light received from the reflector towards the reflector such that the retroreflected light enhances the emitted light to create a light special effect at a location of the reflector.

2. The method of claim 1, wherein the one or more signals are indicative of the surface or end of the object being at a distance from the retroreflective target.

3. The method of claim 1, wherein the retroreflective target comprises a diffraction grating.

4. The method of claim 1, comprising selecting a color of the emitted light based on the identification of the object or a guest holding the object.

5. The method of claim 1, wherein the one or more light sources comprise one or more laser light sources.

6. The method of claim 1, wherein the one or more sensors comprise a camera.

7. The method of claim 1, wherein the one or more sensors comprise a radiofrequency communicator.

8. The method of claim 1, wherein the object comprises a wand.

9. The method of claim 8, wherein a plurality of other wands are oriented to face the retroreflective target and wherein the light is only emitted towards the reflector of the wand and not towards reflectors of the other wands.

10. The method of claim 1, wherein the object comprises a wearable object.

11. A special effects light system configured to generate a halo effect, the system comprising: a retroreflective target;

one or more objects, wherein an object tip of each of the one or more objects comprises one or more light sources, the one or more light sources oriented to face the retroreflective target; and a controller configured to: receive one or more signals indicative of a position of the one or more object tips; and adjust a location of the retroreflective target based on the one or more signals, wherein the controller is configured to generate instructions to modify a surface of the retroreflective target.

12. The system of claim 11, wherein the one or more objects comprise a plurality of wands and wherein the one or more signals are indicative of the position of an individual object tip of an individual wand of the plurality of wands.

13. The system of claim 11, wherein the controller is configured to generate instructions to create surface texture on the retroreflective target.

14. The system of claim 11, wherein the controller is configured to generate instructions to activate a water special effect between the one or more objects and the retroreflective target.

15. A special effects light system configured to generate a halo effect, the system comprising: a retroreflective target disposed within an actuatable object;

an object comprising one or more light sources disposed on an end of the object, one or more sensors configured to output one or more signals indicative of a position of the end of the object, and indicative of identification of the object or a guest holding the object; and a processor configured to: receive the one or more signals output by the one or more sensors; and control the actuatable object to open to expose the retroreflective target when the end of the object is oriented towards the actuatable object and such that the retroreflective target is configured to receive the light from the one or more light sources of the object and to retroreflect the light received towards the end of the object such that the retroreflected light enhances the one or more light sources to create a light special effect at the end of the object based on interaction of the light with the exposed retroreflective target of the actuatable object.

16. The system of claim 15, wherein the object comprises a wand.

17. The system of claim 15, wherein the one or more sensors comprise a camera.

18. The method of claim 1, wherein the retroreflective target is disposed within an actuatable object and wherein the method further comprises controlling the actuatable object to open to expose the retroreflective target when the surface or end of the object is oriented towards the actuatable object.

19. The system of claim 11, wherein the retroreflective target is positioned on a moveable platform configured to adjust the location of the retroreflective target based on the one or more signals.

* * * * *